UNITED STATES PATENT OFFICE.

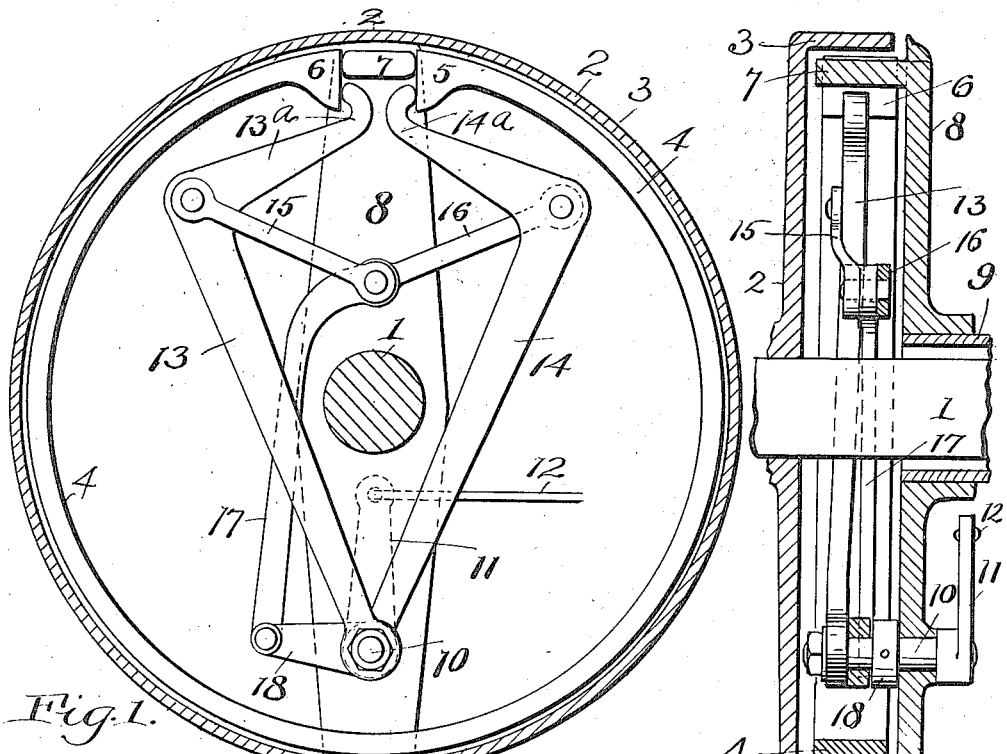
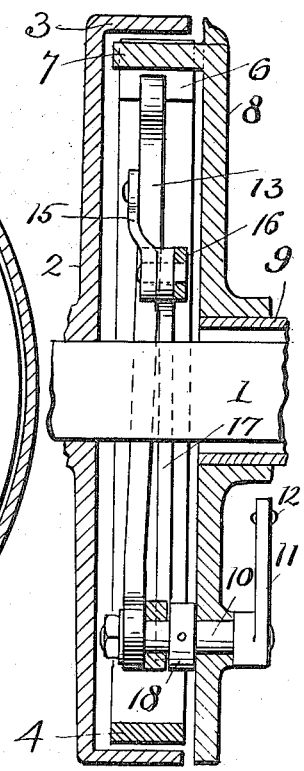
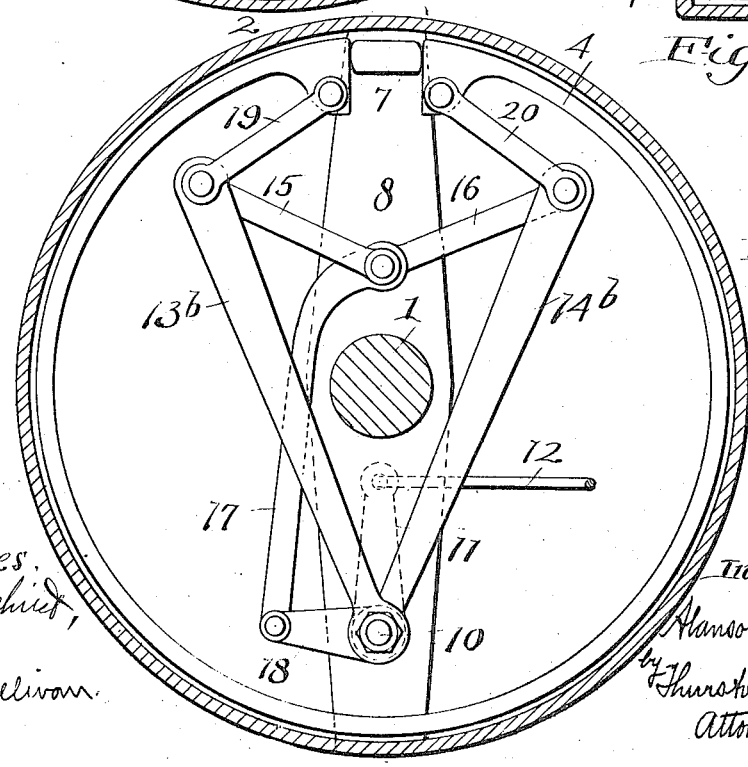

ALANSON P. BRUSH, OF FLINT, MICHIGAN.

INTERNAL BRAKE MECHANISM.

1,186,743.

Specification of Letters Patent.  Patented June 13, 1916.

Application filed February 15, 1911. Serial No. 608,664.

*To all whom it may concern:*

Be it known that I, ALANSON P. BRUSH, a citizen of the United States, residing at Flint, in the county of Genesee and State of Michigan, have invented a certain new and useful Improvement in Internal Brake Mechanism, of which the following is a full, clear, and exact description.

My invention relates to friction brakes of the type which employ a split floating friction band within a rotating brake drum, a fixed stop located between the ends of said band to limit its rotation with the drum, and means for expanding said band to cause it to frictionally engage said drum. The means heretofore used, and with which I am familiar, for expanding said split brake bands are either such (1) that excessive radial pressure is applied to the end portions of the bands, whereby these end portions will engage the drum before other parts of the band do, and will produce excessive braking action and excessive wear upon said end portions (the radially acting wedges or their equivalents being examples of means which produce such results), or, (2) such that the ends portions of the band are caused to bear unequally against the drum (the use of cams between the ends of the band being examples of means which produce this result).

The object of this invention is to provide means through which the brake band may expand in such wise that the engagement of the band with the drum will take place at approximately the same time throughout its entire length, the means being such that they will not interfere with the desired self-setting action of said brake bands when the initial engagement of the band and drum has been brought about.

Broadly speaking, the invention consists of brake band expanding means adapted to apply to the end portions of said bands pressure in substantially tangential directions.

It also consists in the combinations of elements shown in the drawing and hereinafter described and definitely pointed out in the claims.

Reference should be had to the accompanying drawings forming a part of this specification in which—

Figure 1 is a side elevation with certain portions of the brake drum removed, and showing my friction brake. Fig. 2 is a section upon the line 2—2 of Fig. 1; and Fig. 3 is a view similar to Fig. 1, showing a modified form of the device.

A rotating shaft is represented at 1 to which is secured a rotating brake drum 2 which overhangs a split floating brake band 4. A fixed stop 7 lies between the ends 5 and 6 of said band, and limits the rotary movement of said brake band with the drum. This stop is a part of a bracket 8 projecting from the tubular non-rotating support 9 in which is the bearing for the rotary member, of which the brake drum is a part.

Through the lower portion of the bracket 8, a short shaft 10 extends, to one end of which is secured a lever 11 which may be connected with any suitable operating mechanism through the intermediary of the rod 12. Two levers 13 and 14 are pivoted upon the shaft 10, or any other supporting shaft carried by said bracket; and in the form shown in Fig. 1, these levers assume the shape of bell crank levers with their free ends 13ª and 14ª of hook like form, which pass between and bear respectively upon the ends 6 and 5 of the brake band. A pair of toggle levers 15 and 16 are pivoted to each other at one of their ends, and at their opposite ends are pivoted upon the arms 13 and 14. There is a rod 17 which is pivotally connected with the levers 15 and 16 at the point where they join, and this rod 17 at its opposite end is pivoted upon an arm 18 which is made fast upon the shaft 10.

The operation will be clear from the disclosure, for when the rod 12 is pulled, motion is transmitted to lever 11, and from it to shaft 10, whereby arm 18 causes the rod 17 to move so as to swing the levers 15 and 16 toward the toggle straightening position. This action will cause the arms 13 and 14 to be spread apart and to apply pressure, in a substantially tangential direction, to the ends of the brake band 4; and this will produce such uniform enlargement of the brake band that all parts of it will engage at approximately the same instant with the drum. The stop 7 which projects between the ends of the brake band stops the rotation thereof by engagement with the rear end of said band, that is so with the end of the band on the left side of the stop if the drum is turning to the right, or vice versa. This permits the desirable self-setting action of the brake whichever direction the drum is rotating in. In fact, the described brake has all of the desirable qualities of the brakes heretofore used in which the split band is expanded by a wedge, and it has also the added advantage that the band engages uniformly throughout its entire periphery. This is because the levers 13 and 14 being pivoted, must move in the arcs of circles and therefore whatever pressure they may apply under any condition of use will be applied in a direction substantially tangential to the brake band at the ends thereof, and the force acts only to spread the ends, and does not push the ends radially into contact with the drum.

In the form shown in Fig. 3, the same general construction is observed, with the exception that the levers 13$^b$ and 14$^b$ are not bell crank levers. Instead the free ends of these levers are pivotally connected with links 19 and 20 which in turn are pivotally connected with the ends of the brake band 4, but in other respects the construction is the same; and the action is also the same in that it applies the spreading force to the brake band in the substantially tangential direction referred to.

It is to be understood that various mechanisms may be employed for spreading the arms 13 and 14,—and for transmitting movement from these arms to the ends of the brake band, provided the latter mechanism is such as to impart the substantially tangential movement to the end of the brake band.

Having thus described my invention, what I claim is:

1. The combination of a brake drum, an expansible split brake band within said drum, a fixed stop located between the ends of the brake band and serving by engagement with one end or the other as the sole means to prevent the brake band from turning, two movable devices for spreading apart the ends of said brake band, each of which devices engages the brake band near one end thereof and extends away from that point of engagement and away from the other movable device, and means acting on said devices at points remote from their adjacent ends for drawing apart said devices and therefore the ends of the brake band.

2. The combination with a brake drum, of a split brake-band within the flange, a stop between the ends of said band, a pair of arms pivoted upon a fixed support, each arm being operatively connected with one of the opposite ends of the band, a toggle, the links of which are respectively pivoted to said arms, and mechanism for operating said toggle.

3. The combination with a support, of a fixed bracket, a rotating brake drum adjacent to said bracket, a split brake-band within the flange of the rotating member, a stop fixed to said bracket and located between the ends of said band, a pair of arms pivoted upon the bracket, the opposite ends of said arms being operatively connected with the ends of the brake band, a toggle operatively connecting said arms, and means for operating the toggle.

4. The combination with a support, a fixed bracket, a rotating brake drum adjacent to the bracket, a split expansible brake band within said drum, a shaft mounted in said bracket, a pair of arms loosely mounted upon said shaft, there being operative connections between the free end of each of said arms and an end of the brake band, a toggle for spreading said arms, a rod for operating the toggle, and an arm connected with the shaft and with said rod, and an operating arm connected with said shaft.

In testimony whereof, I hereunto affix my signature in the presence of two witnesses.

ALANSON P. BRUSH.

Witnesses:
  A. H. NACKER,
  E. L. THURSTON.